US006667679B2

United States Patent
Carlson et al.

(10) Patent No.: US 6,667,679 B2
(45) Date of Patent: Dec. 23, 2003

(54) JOINT INCLUDING A FIELD RESPONSIVE MATERIAL AND METHOD

(75) Inventors: J. David Carlson, Cary, NC (US); Lynn C. Yanyo, Cary, NC (US)

(73) Assignee: Lord Corporation, Cary, NC (US)

( * ) Notice: Subject to any disclaimer, the term of this patent is extended or adjusted under 35 U.S.C. 154(b) by 202 days.

(21) Appl. No.: 09/839,448

(22) Filed: Apr. 20, 2001

(65) Prior Publication Data

US 2001/0032967 A1 Oct. 25, 2001

Related U.S. Application Data

(60) Provisional application No. 60/199,068, filed on Apr. 20, 2000.

(51) Int. Cl.[7] .................................................. H01F 7/20
(52) U.S. Cl. ....................................... 335/285; 335/205
(58) Field of Search ............................ 335/205–207, 335/285; 403/273–285, DIG. 1

(56) References Cited

U.S. PATENT DOCUMENTS 3,951,560 A    4/1976   Beer

FOREIGN PATENT DOCUMENTS

| DE | 89 05 524 | 5/1989 |
| WO | WO 00/11351 | 3/2000 |

*Primary Examiner*—Tuyen T. Nguyen
(74) *Attorney, Agent, or Firm*—Michael M. Gnibus; Edward F. Murphy, III

(57) ABSTRACT

A temporary joint that includes a first discrete member having a first edge and a first movable coupling means; and a second discrete member having a second edge and a second movable coupling means. When it is necessary to form a joint between the first and second discrete members, the first and second edges are moved into abutment to define a binding edge. Then, the first and second movable coupling means are moved toward the binding edge; and the temporary joint is formed when the first and second movable coupling means are proximate the binding edge. The joint is broken by moving the first and second coupling means away from the binding edge. The first coupling means is comprised of a volume of a field responsive material and the second coupling means is a field producing means such as a magnet. A rigid joint is produced when the field producing supplies a field across the field responsive material.

19 Claims, 4 Drawing Sheets

JOINT INCLUDING A FIELD RESPONSIVE MATERIAL AND METHOD

CROSS REFERENCE

This application claims the benefit of Provisional Application Ser. No. 60/199,068 filed Apr. 20, 2000.

FIELD OF THE INVENTION

The invention generally relates to devices that are actuated using a field responsive material, and more specifically the invention relates to a joint that includes a field responsive material and method for selectively and releasably joining at least two discrete members in fixed abutment along discrete member binding edges.

BACKGROUND OF THE INVENTION

Field responsive devices include a volume of a field responsive material such as a magnetorheological (MR) fluid to control the motion of such devices. Magnetorheological fluid may be comprised of either a volume of magnetizable particles or more frequently may be comprised of magnetizable particles suspended in a viscous liquid carrier such as oil, water or silicone. In either its dry form or liquid form, the MR fluid functions in a similar manner. During use, when a magnetic field is applied across the MR fluid, the suspended particles are magnetized and as a result are held in place by the applied magnetic field and the magnetized fluid assumes an apparent solid state. When the magnetic field is removed, the MR fluid returns to its pre magnetized state comprised of dry loose particles or a liquid.

Known field responsive devices are typically comprised of rotary and linear acting motion control devices where the rotary devices frequently include brakes, clutches and the like for providing variable torques while linear acting devices can be used for damping linear motion or for providing controllable dissipative forces along a specified axis. In known field responsive devices the field is applied across the material in a precise manner to accurately control the forces and torques supplied by such devices. The field responsive devices provide the torques and forces supplied by conventional mechanically actuated devices and as a result, in known linear and rotary devices the mechanical componetry is replaced by a volume of field responsive material and a means for intermittently supplying a field across the material. By incorporating field responsive material in known mechanical devices the mechanical design is simplified, and in most instances because the mechanical componetry is replaced by a field responsive material the field responsive devices have a longer useful life than the mechanically actuated counterpart devices.

In addition to the foregoing, it would be beneficial to use the field responsive material in a joint for connecting discrete members. By incorporating a volume of a field responsive material in a joint, mechanical fasteners and other components may be eliminated and the discrete members could be connected and disconnected easily and reliably.

The foregoing illustrates limitations known to exist in present devices and methods. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention this is accomplished by providing a temporary joint that includes a volume of field responsive material. The temporary joint comprises a first discrete member having a first edge and a first movable coupling means; and a second discrete member having a second edge and a second movable coupling means.

When it is necessary to form a joint between the first and second discrete members, the first and second edges are moved into abutment to define a binding edge. Then, the first and second movable coupling means are moved toward the binding edge; and the temporary joint is formed when the first and second movable coupling means are proximate the binding edge. When the coupling means are in the required locations, a magnetic field is applied across the field responsive material so that the field responsive material approaches a near solid state. The joint is broken by moving one or both of the first and second coupling means away from the binding edge.

In another aspect of the invention the first coupling means is a volume of magnetorheological fluid and the second coupling means is a magnet.

The foregoing and other aspects of the invention will become apparent from the following detailed description of the invention when considered in conjunction with the accompanying drawing figures.

BRIEF DESCRIPTION OF THE DRAWING FIGURES

DETAILED DESCRIPTION

Figure 1:
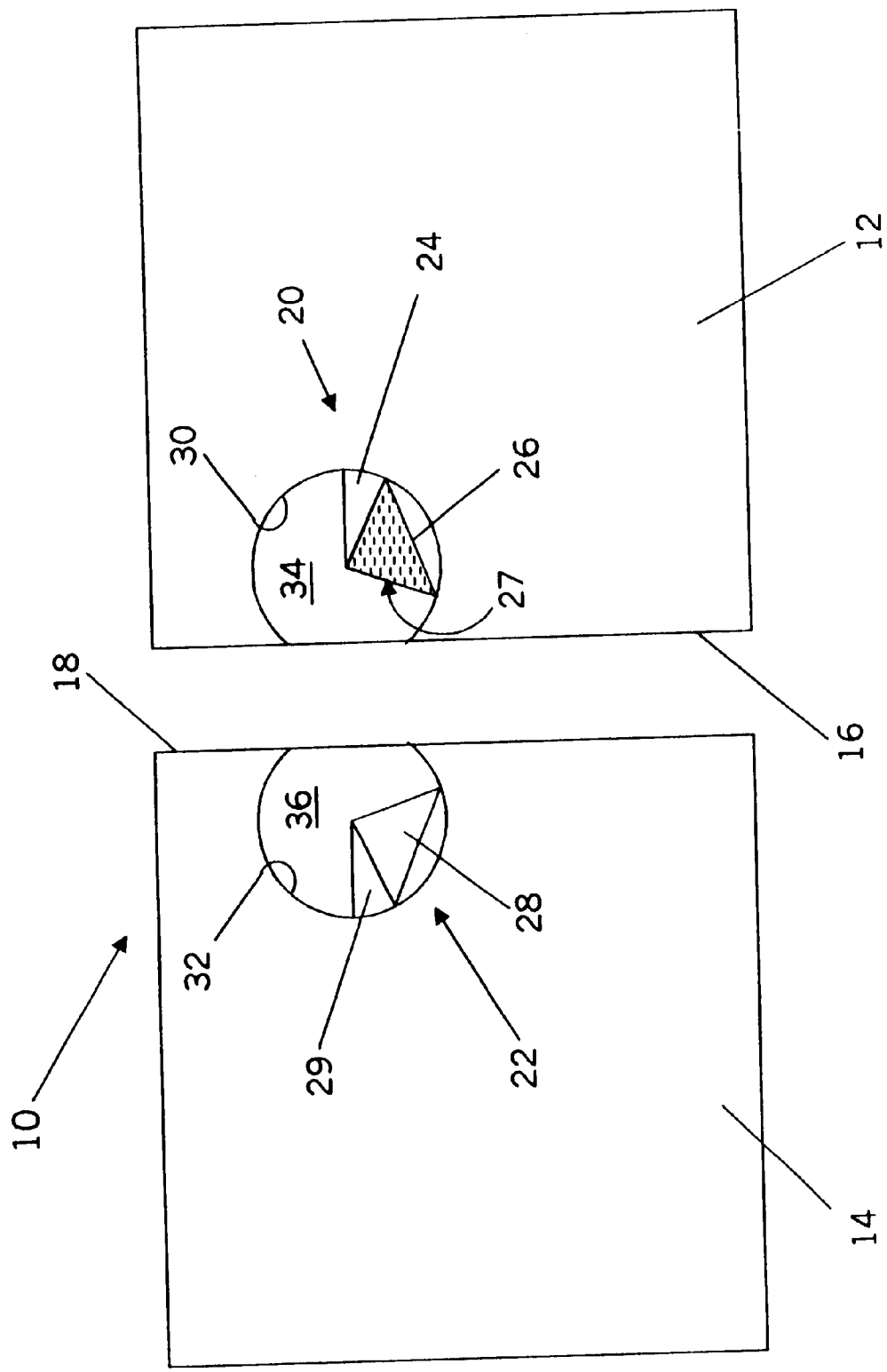
FIG. 1 is a schematic representation of the first and second discrete members including the first and second coupling means with the temporary joint broken.

Turning now to the drawing Figures wherein like parts are referred to by the same numbers in the several views, FIG. 1 shows the temporary joint of the present invention 10 that includes first and second discrete members 12 and 14 respectively. In FIG. 1 the members 12 and 14 are shown spaced apart and are not joined by temporary joint 10.

First and second members 12 and 14 respectively include first and second edges 16 and 18; and first and second coupling means 20 and 22. For purposes of describing the preferred embodiment of the invention, the first and second members are planar and substantially square. The members 12 and 14 may be pages from one or more books for example. It should be understood that one or both of the members 12 and 14 could assume any shape. The members 12 and 14 may assume any polygonal shape and may include rises and depressions that extend above and below the plane of the member. Additionally, the joint could be formed at edges that are straight or curved or could be comprised of interengaging mating teeth. Additionally, although the temporary joint is shown and described as being formed between two discrete members 12 and 14 and coupling members 20 and 22 any number of discrete members and coupling members may be combined to form temporary joint 10.

First coupling means 20 is comprised of raised gripping member 24 and an enclosure 27 that contains a volume of magnetorheological fluid 26. The enclosure 27 moves with the member 24. The gripping member extends outwardly substantially perpendicular to the member 12 although the gripping member may extend away from member 12 at any suitable angle relative to the member 12. The field responsive MR material which is comprised of magnetizable particles in a liquid carrier is placed in a sealed enclosure 27 which has the shape of an equilateral triangle. The enclosure prevents the MR fluid from leaking and keeps the viscous fluid contained in a finite volume.

The gripping member is made integral with the enclosure 27 along one side of the enclosure so that as the gripping member is displaced the enclosure is either moved in a first direction or second direction. The gripping member and enclosure may be made integral using any suitable well known means such as a conventional adhesive for example. The first and second directions are the clockwise and counterclockwise directions represented by arrows 50. See FIGS. 2 and 3. However, the first and second directions may be any required linear or non-linear directions that ultimately cause the coupling means to be moved proximate each other to produce joint 10. The enclosure is shown as an equilateral triangle for purposes of describing the preferred embodiment of the invention however it should be understood that the enclosure may assume any shape that is adapted to be located proximate the magnet member 28 described hereinbelow.

Second coupling means 22 is comprised of second raised gripping member 29 and a field producing magnet 28. As shown in FIG. 1, like the field responsive material enclosure 27, the magnet is in the shape of an equilateral triangle. The lengths of the sides of both triangles are substantially the same. The gripping member extends away from member 14 at a suitable angle relative to member 14. The gripping members 24 and 29 may be comprised of a handle, knob, lever or any other suitable member that can easily be gripped by a person attempting to create or break joint 10. The gripping member 29 is made integral with the magnet 28 along one side of the magnet so that as the magnet is displaced the magnet moves in either a first direction or a second direction. The gripping member 29 and magnet 28 may be made integral using any conventional means well known to one skilled in the art such as a conventional adhesive.

The field producing means 28 and gripping member 29 are adapted to be seated in guide groove 36 and the field responsive material and enclosure 27 and gripping member 24 are adapted to be seated in guide groove 34. See FIG. 4. The means 28 and member 29 and enclosure 27 and member 24 are removably seated in their respective grooves. The guide grooves are recessed grooves 34 and 36 which define respective arcuate paths 30 and 32 that terminate at respective edges 16 and 18. As a result, the coupling means are movable in the arcuate paths in clockwise and counterclockwise directions 50 toward and away from respective edges 16 and 18. See FIG. 3. Although magnet 28 gripping members 24 and 29 and enclosure 27 are shown as with triangular configurations, it should be understood that the gripping members magnet and enclosure may assume any suitable shape or configuration.

Figure 2:
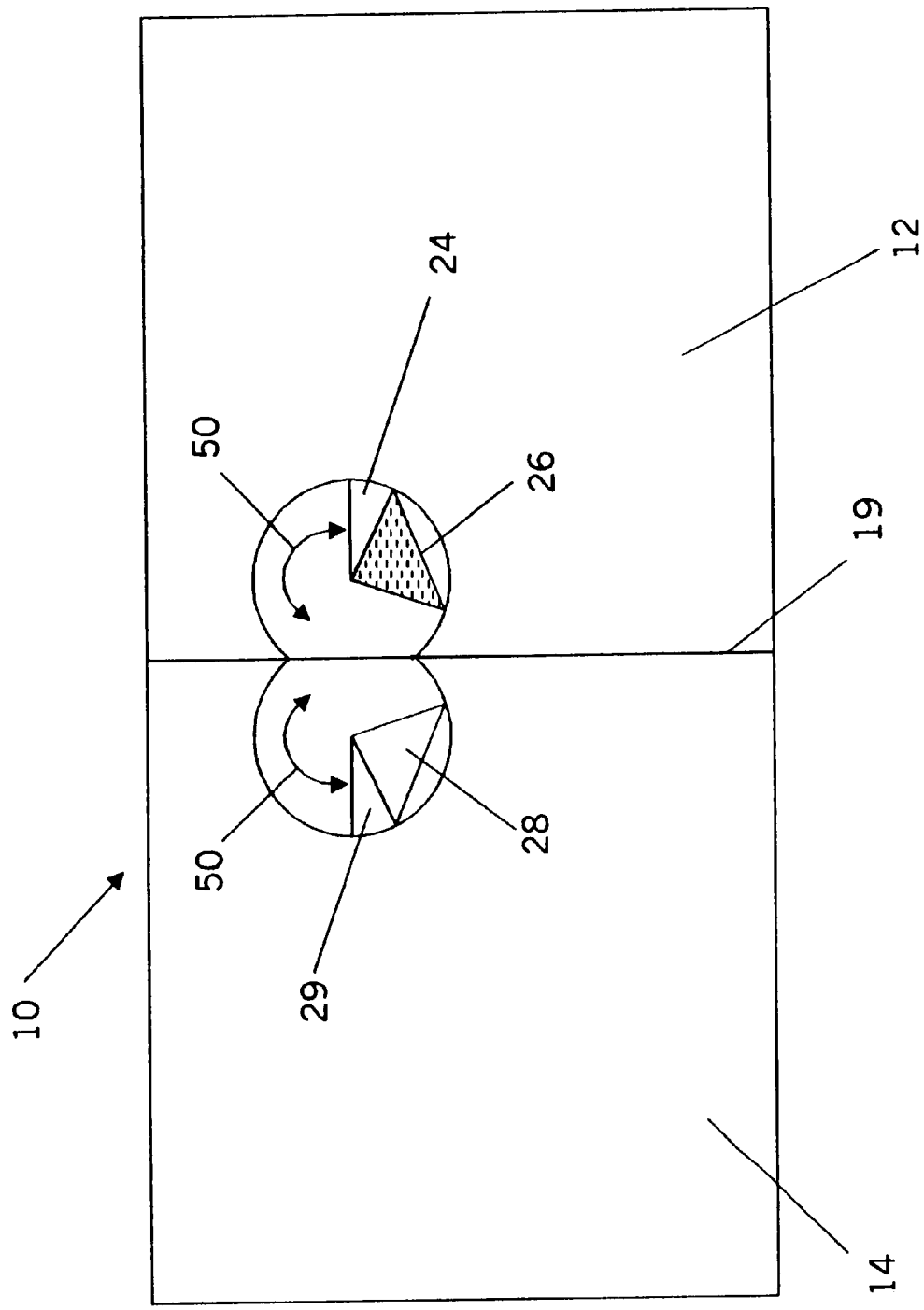
FIG. 2 is a schematic representation of the first and second discrete members of FIG. 1, with the member edges in abutment and the coupling means away from the member binding edges.
Figure 3:
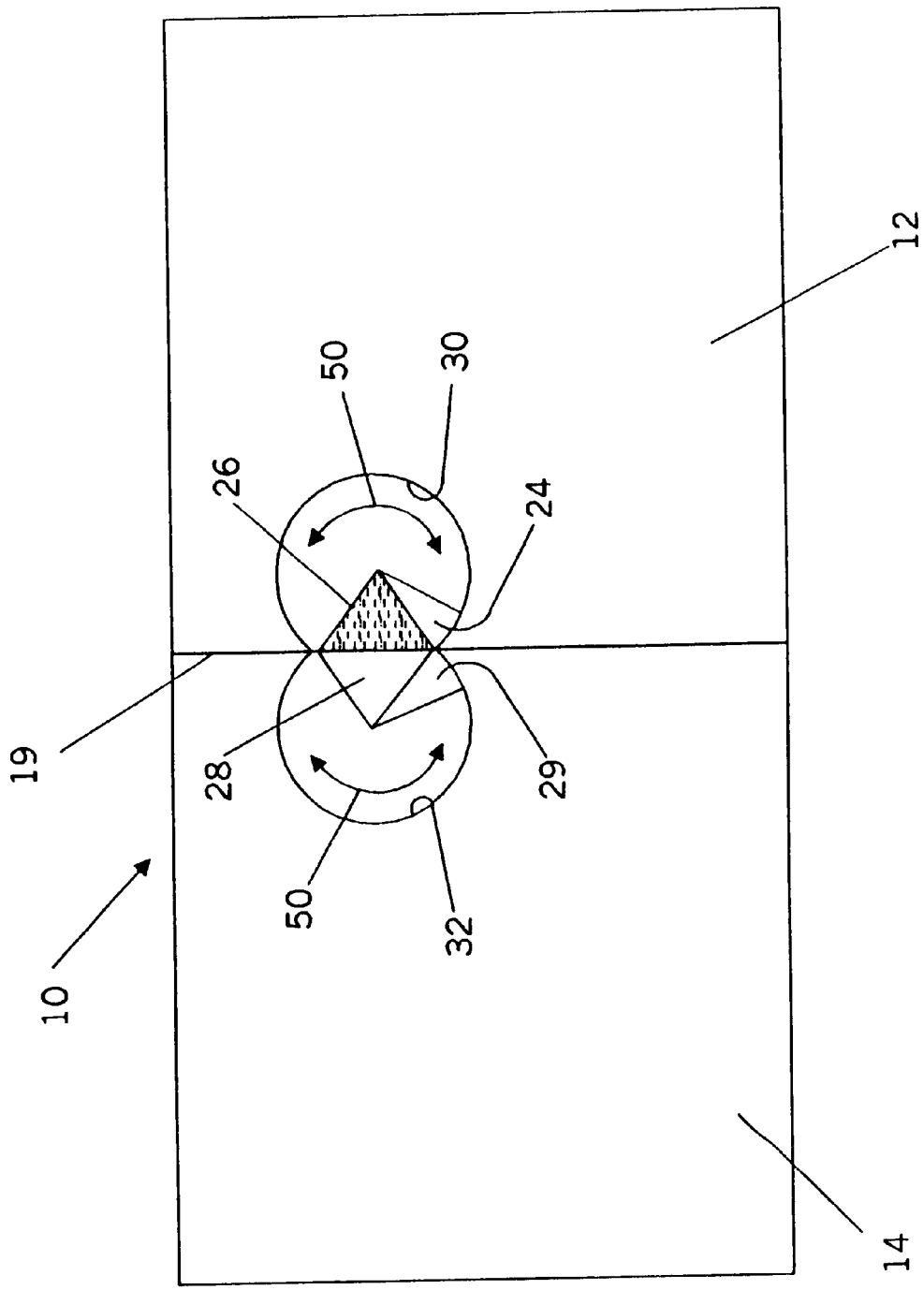
FIG. 3 is a schematic representation of the first and second discrete members of FIG. 2 with the coupling means proximate the binding edge to form the temporary joint.
Figure 4:
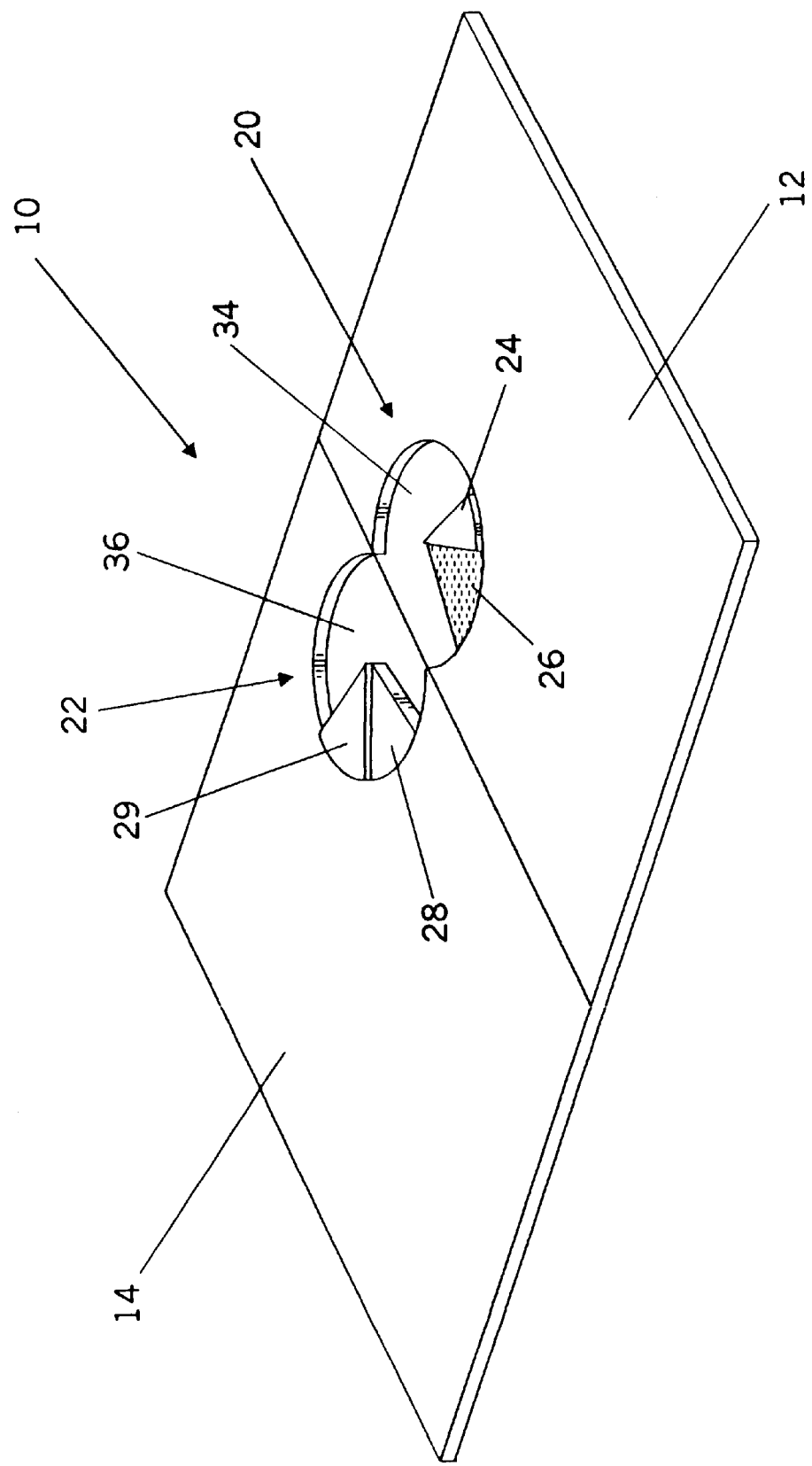
FIG. 4 is an isometric view of the temporary joint of FIG. 3.

Operation of the temporary joint 10 will now be described. Turning to FIGS. 2 and 3, when it is necessary to form a temporary joint 10 the edges 16 and 18 are butted together to form a binding edge 19. The coupling members are removably located in their respective grooves 34 and 36. The grooves 34 and 36 are aligned. The first and second coupling members are then moved in opposite directions along their respective arcuate paths 30 and 32 by gripping members 24 and 29 thereby urging the MR fluid and magnet towards binding edge 19. For example, the coupling means 20 may be moved in a clockwise direction and the coupling means 22 may be moved in a counterclockwise direction.

As the magnet and material are proximate edge 19, the magnet produces a field that magnetizes the magnetic particles in the material forming a rigid joint 10 at the edge 19. In this way, the discrete members can not be separated. When the joint is formed edges or sides of the triangular magnet and MR fluid enclosure are in contact. The MR fluid is a controllable material that responds to a magnetic field. The MR fluid changes from a viscous fluid to almost a solid in an instant. Thus the MR fluid and magnet serve as a structural link or joint that holds the members together.

The joint formed is a butt joint. For purposes of describing the preferred embodiment of the invention the first and second members are butted together in a single plane, however it should be understood that the members could be oriented at any angle relative to each other. The members could be perpendicular to each other for example.

When it is necessary to break the joint, at least one of the coupling means is moved away from the binding edge, thereby demagnetizing the particles in the MR fluid and returning the MR fluid to its demagnetized non-solid state.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What is claimed is:

1. A temporary joint comprising:
   (a) a first discrete member having a first edge, the first discrete member having a first movable coupling means comprising field producing means;
   (b) a second discrete member having a second edge, the first and second edges being adapted to be moved into abutment to define a binding edge; the second discrete member having a second movable coupling means, the second coupling means comprising a volume of a field responsive material, the first and second coupling means being movable toward and away from the first and second edges respectively; and wherein the temporary joint is formed by moving the coupling means proximate each other and the temporary joint is broken when at least one of the coupling means is moved away from the other coupling means.

2. The temporary joint as claimed in claim 1 wherein the first coupling means is comprised of a volume of magnetorheological fluid.

3. The temporary joint as claimed in claim 1 wherein the second coupling means is comprised of a magnet.

4. The temporary joint as claimed in claim 3 wherein the magnet is a permanent magnet.

5. The temporary joint as claimed in claim 1 wherein the temporary joint is a butt joint.

6. The temporary joint as claimed in claim 1 wherein the first coupling means is moveable in an arcuate path.

7. The temporary joint as claimed in claim 1 wherein the second coupling means is moveable in an arcuate path.

8. The temporary joint as claimed in claim 1 wherein the first coupling means further comprises a first gripping element, and the volume of field responsive material is contained in an enclosure, the first gripping element being made integral with the enclosure.

9. The temporary joint as claimed in claim 8 wherein the first gripping element and enclosure are movable together.

10. The temporary joint as claimed in claim 1 wherein the second coupling means further comprises a second gripping element, the field producing means being made integral with the second gripping element.

11. The temporary joint as claimed in claim 10 wherein the second gripping element and field producing means are movable together.

12. The temporary joint as claimed in claim 8 wherein the first and second gripping elements are hand levers.

13. The temporary joint as claimed in claim 8 wherein the enclosure is triangular.

14. The temporary joint as claimed in claim 4 wherein the magnet is triangular.

15. The temporary joint as claimed in claim 10 wherein the second gripping element includes a tail portion adapted to be movable through a second guide groove.

16. The temporary joint as claimed in claim 8 wherein the first gripping element includes a first tail portion adapted to be movable through a first guide groove.

17. The temporary joint as claimed in claim 15 wherein the guide groove defines an arcuate path.

18. The temporary joint as claimed in claim 16 wherein the guide groove defines an arcuate path.

19. A joint comprising: (A) a first movable coupling means comprising field producing means; and (B) a second movable coupling means, the second coupling means comprising a volume of a field responsive material, the first and second coupling means being movable along respective paths toward and away from each other, and wherein the joint is formed by moving the coupling means proximate each other and the joint is broken when at least one of the coupling means is moved away from the other coupling means.

* * * * *